Feb. 10, 1942.   J. W. CARLSON   2,272,184
MEASURING VALVE
Filed June 18, 1938
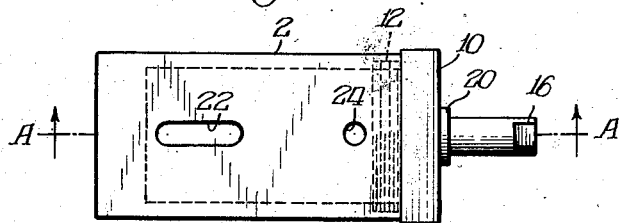
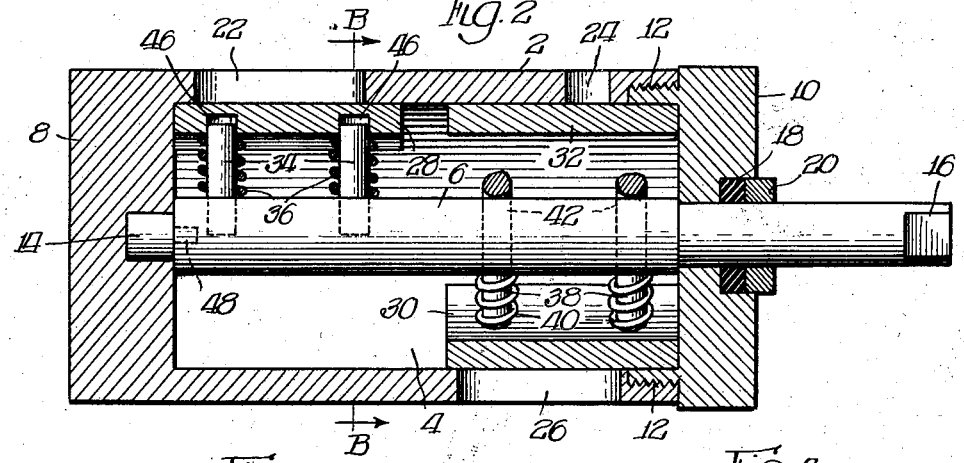
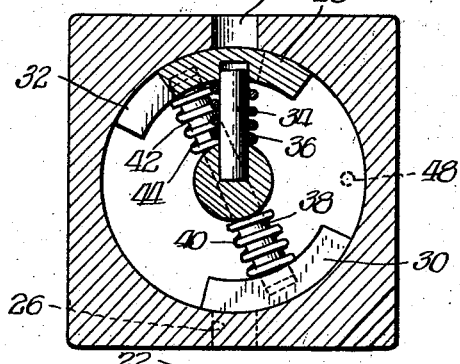
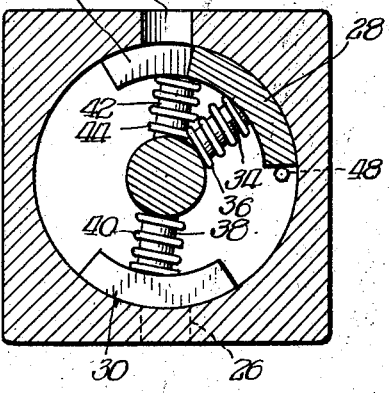
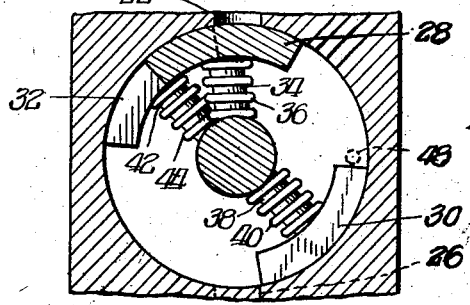
INVENTOR.
John W. Carlson
BY Richard Spencer
ATTORNEY.

Patented Feb. 10, 1942

2,272,184

UNITED STATES PATENT OFFICE 2,272,184

MEASURING VALVE

John W. Carlson, Chicago, Ill., assignor to Automatic Canteen Company of America, Chicago, Ill., a corporation of Delaware Application June 18, 1938, Serial No. 214,431

8 Claims. (Cl. 221—116)

This invention relates to a new and improved type of measuring valve and more particularly to a new and improved type of measuring valve adapted to be used in drink dispensing machines.

The usual type of measuring valve or measuring faucet is composed of two closely fitting casings or shells, one within the other and so arranged that openings in the casings will coincide with each other at certain intervals when the inner casing is turned. Such valves or measuring chambers suffer from the disadvantage that the constant wear caused by turning the inner casing results in leaking after the valve has been in use over a continuous period of time. For this reason valves or measuring chambers of this type leave much to be desired and are not very practical for use in drink dispensing machines which are usually placed in widely separated locations and are not under any direct supervision at all times. If leakage occurs in such machines the syrup or other material to be measured and to be used in dispensing a drink from the machine may be entirely lost before it is possible to make the proper repairs.

With the foregoing considerations in mind, one of the objects of the present invention is to provide a new and improved type of measuring valve particularly adapted for measuring syrups, and the like, in drink dispensing machines which does not suffer from the disadvantages of the previously described concentric casing type valves.

Another object of the invention is to provide a new and improved simple type of measuring valve having very few moving parts and so constructed that continued use of the valve will not cause it to leak but if anything will tend to give it better wearing qualities and render it less likely to leak.

A still further object of the invention is to provide a new and improved type of measuring valve in which the wearing parts can readily be removed and replaced without replacing other non-wearing parts of the valve.

A still further object of the invention is to provide a new and improved type of measuring valve in which the wearing parts occupy a relatively small space and which is free from wearing parts except where such parts are absolutely necessary.

These objects are accomplished in accordance with this invention by the provision of a measuring valve comprising a measuring chamber, an inlet, an outlet and a pressure equalizing vent in the walls of said chamber and means operated from a shaft disposed within said chamber for opening and closing the inlet, outlet and pressure equalizing vent at predetermined times.

In its more specific aspects the improved measuring valve of the present invention preferably comprises a cylindrical measuring chamber, a shaft centrally and longitudinally disposed in said chamber, arms on said shaft extending outwardly therefrom toward the inner side walls of the chamber, valve shoes mounted on said arms, said valve shoes having the outer surfaces of a contour adapted to fit snugly against the inner walls of the chamber, resilient means, as, for example, a spring or springs on said arms adapted to press said valve shoes into engagement with the inner side walls of the chamber, an inlet, an outlet and a pressure equalizing vent in the side walls of said chamber, said inlet and said outlet preferably being placed toward opposite ends of the chamber and in substantially diametrically opposed portions thereof and said pressure equalizing vent preferably being placed in a position diametrically opposed to the outlet. Thus, in operation the valve shoes are adapted to open the inlet while maintaining the outlet closed when the shaft is rotated to one position and to open the outlet and the pressure equalizing vent while maintaining the inlet closed when the shaft is rotated to another position.

Other objects and features of the invention will be apparent by reference to the following description thereof in view of the accompanying drawing in which:

Figure 1 represents a top plan view of a preferred form of said measuring valve;

Figure 2 represents a cross section in side elevation along the lines A—A of Figure 1;

Figure 3 represents a cross section of Figure 2 along the lines B—B showing the measuring chamber with the inlet, the outlet and the pressure equalizing vent all closed;

Figure 4 is a cross section similar to Figure 3 but showing the measuring chamber with the inlet open and the pressure vent and outlet closed; and Figure 5 is another view in cross section similar to Figure 3 but showing the inlet closed and the outlet and pressure equalizing vent both open.

As illustrated in Figure 2, the measuring valve may comprise an outer casing 2 having therein a chamber 4 in which is disposed preferably centrally and longitudinally, as illustrated, a shaft 6. The casing 2 may be made from a metal of any suitable type by casting, machining, or in any suitable manner. As illustrated in the drawing, one end 8 of casing 2 is integral with the side walls. The other end 10 is removable, threads 12 being provided in order to maintain the end 10 in threaded relationship with casing 2. If for any reason it is desirable to obtain access to chamber 4, the end 10 may be readily removed simply by unscrewing it. Shaft 6 passes through a hole in end 10 and one extremity 14 of shaft 6 is seated in a recess in the end portion 8 of casing 2, the construction and seating being such that shaft 6 is free to rotate and may be rotated by engagement of a lever or other suitable means at point 16.

In order to seal the chamber against escape of liquids along shaft 6, a washer 18 made of natural or synthetic rubber, or any other suitable type of material, is provided. This washer in turn is held in place by some convenient method, as, for example, a metal washer 20. In the top of the measuring chamber, as shown in Figures 1 and 2, there is an inlet 22 and a pressure equalizing vent 24. At the bottom of chamber 4 is an outlet 26.

The inlet, outlet and pressure equalizing vent are opened and closed at predetermined times by means of valve shoes 28, 30 and 32, respectively. These valve shoes 28, 30 and 32 are carried on arms fixed to shaft 6 and are pressed snugly against the interior of chamber 4, being of sufficient size to permit opening and closing of the respective holes or vents, as illustrated. Valve shoe 28 is carried by arms 34, 34 each of said arms being provided with coiled springs 36, 36 which resiliently press valve shoe 28 against the top of chamber 4. Valve shoe 30 is held in place by means of arms 38, 38 and springs 40, 40. Valve shoe 32 is resiliently and snugly held against the wall of chamber 4 in a similar manner by means of a pair of arms 42, 42 and springs 44, 44. These arms which hold the valve shoes in place may be integral with shaft 6 or removable therefrom. Thus, they may be cast in the same piece with shaft 6 or made integral therewith by soldering or welding, or they may be screwed into the shaft in such a manner that they may be readily removed.

The valve shoes are ordinarily merely slideably seated on each pair of arms, not attached thereto in fixed relationship. Thus, as shown in Figure 2, with respect to valve shoe 28 there are normally spaces 46, 46 between the tops of the arms 34, 34 and the valve shoe. This same arrangement is used in all of the valve shoes so that when the end 10 of the casing is removed and shaft 6 is withdrawn, the valve shoes 28, 30 and 32 automatically drop off of the arms which normally act as a support therefor.

It would be possible, and in some cases might be desirable, to open and close the various openings in chamber 4 by rotating shaft 6 through a complete revolution. As described in the drawing, however, opening and closing of the inlet, outlet and pressure equalizing vent is effected by a clockwise and counterclockwise movement of shaft 6, complete rotation being prevented by means of a stop 48 positioned in the path of the valve shoes. As illustrated in the drawing, pressure equalizing vent 24 is preferably substantially diametrically opposite outlet vent 26. Inlet opening 22 is likewise preferably on an opposite side of chamber 4 from outlet 26. In Figure 3, the valve shoes are shown in such position that inlet 22, outlet 26 and pressure equalizing vent 24 are all closed. In Figure 4, inlet 22 is open while outlet 26 and pressure equalizing vent 24 are both closed. In Figure 5, outlet 26 and pressure equalizing vent 24 are both open and inlet 22 is closed.

The operation of the valve is as follows. When it is desired to fill chamber 4 with a predetermined amount of syrup, or other liquid, shaft 6 is rotated until the valve shoes are in the position shown in Figure 4, whereupon the liquid enters through opening 22 from any suitable source, as, for example, from a pipe or conduit leading from a tank or other container, not shown. After a predetermined time, based upon a knowledge of the time required for a given liquid to fill the chamber, shaft 16 is rotated in a counterclockwise direction, thereby closing inlet 22 and simultaneously opening outlet 26 and pressure equalizing vent 24, as shown by the position of the valve shoes in Figure 5. The liquid in chamber 4 then flows out through outlet 26. It will be understood that the liquid will flow out of chamber 4 even though no pressure equalizing vent is provided, but in such cases a vacuum will tend to build up above the liquid and retard its flow. Since the present valve is primarily designed for drink dispensing machines where rapid and automatic action is desirable, a pressure equalizing vent 24 is preferably provided.

After the liquid has been delivered through outlet 26, shaft 6 is rotated in a clockwise direction, thereby closing outlet 26 and pressure equalizing vent 24. If desired, rotation of the shaft may be stopped in such a position that inlet 22 is also closed, as illustrated in Figure 3, or rotation may be continued until valve shoe 34 strikes stop 48. At this point inlet 22 is open and chamber 4 is refilled.

Movement or rotation of shaft 6 may be accomplished automatically by any suitable type of mechanism, as, for instance, a motor automatically started by a coin control mechanism. Since the invention herein described relates to the valve itself and many different types of mechanisms can be employed for operating such a valve, these mechanisms will not be discussed in detail.

One of the outstanding distinctions of the present invention is the provision of a measuring valve which may be simply and easily constructed with a minimum number of wearing parts. Thus, as shown in the drawing, valve shoes 28, 30 and 32 occupy only a relatively small area within chamber 4, this area being determined largely by the size of the inlet or outlet openings and by the size of the pressure equalizing vent. Hence, there is a minimum area of surface exposed to wear.

Another outstanding feature of this invention resides in the fact that the valve shoes are resiliently held by means of springs or other suitable means against the inner surface of the measuring chamber. This insures a snug fit between the valve shoes and the surfaces of the measuring chamber. Constant turning and wearing of the valve shoes on the surface of the measuring chamber does not destroy the snugness of this fit because the valve shoes are at all times resiliently held against the surface of the measuring chamber and in fact the closeness of the relationship between the valve shoes and the inner surface of the measuring chamber may be increased. This is impossible in the ordinary type of measuring valve where two concentric shells are employed, one within the other. In such measuring valves it is practically impossible to provide for wear, and when wear does occur, there is no way of taking care of it with the result that leakage can hardly be avoided. Furthermore, there is a large wearing surface in the concentric shell type of measuring valve. In the present type of measuring valve when the valve shoes become worn it is only necessary to replace the worn shoes and since these occupy a relatively small area, little expense is involved.

It will be understood that variations may be made in the type of measuring valve described without departing from the invention. For example, the inlet, outlet and pressure equalizing openings may be varied in size. While an elongated slotted opening is preferably employed for the inlet and outlet, as illustrated in Figures 1 and 2, nevertheless, round, square, rectangular or any other type of openings may be used. The same is true for the pressure equalizing vent. The pressure equalizing vent need not necessarily be placed directly opposite the outlet. It may be in any other part of the measuring chamber, as long as it is in such a position that it affords access to the space above the liquid when the liquid is passing through the outlet. While the inlet is preferably in an upper part of the chamber, as shown, it will be apparent that it may be in other parts of the chamber.

In operating the measuring valve, the casing 2 may be tilted in order to increase the flow of liquid through the outlet. The exterior of casing 2 is preferably square or some other complemental shape in order to permit the arrangement of a number of said valves side by side in a selective drink dispensing machine where different types of drinks are to be dispensed requiring the measurement of different types of syrups. It will be understood that any other shape may be given to the exterior portion of the valve without departing from the invention. The materials of construction may be varied to suit the particular type of liquids being measured and dispensed. Normally all parts may be made of metal except possibly washers, but resins and other materials of construction may be used. If desired, end 8 of the measuring valve illustrated in Figure 2 may be attachable and removable in a manner similar to end portion 10. If both ends are made removable, instead of using a screw threaded arrangement, they may be held in place by means of long screws extending through chamber 4. These screws may also serve as stops to limit the movement of the valve shoes.

Having thus described the invention, what I claim as new and desire to secure by Letters Patent of the United States is:

1. A measuring valve comprising, in combination, a measuring chamber, an inlet to said chamber, an outlet from said chamber, a pressure equalizing vent in the walls of said chamber, a centrally disposed rotatable shaft in said chamber and means resiliently pressing outwardly from said shaft adapted to open and close said inlet, said outlet and said pressure equalizing vent.

2. A measuring valve comprising, in combination, a cylindrical measuring chamber, an inlet, an outlet and a pressure equalizing vent in the side walls of said chamber, a rotatable shaft centrally and longitudinally disposed in said chamber and means resiliently pressing outwardly from said shaft adapted to open and close the inlet, the outlet and the pressure equalizing vent at predetermined times when the shaft is rotated.

3. A measuring valve comprising, in combination, a cylindrical measuring chamber, a shaft centrally and longitudinally disposed in said chamber, arms on said shaft extending outwardly therefrom, valve shoes mounted on said arms, resilient means on said arms adapted to press said shoes into engagement with the inner side walls of the chamber, an inlet, an outlet and a pressure equalizing vent in the side walls of said chamber, said inlet and said outlet being placed toward opposite ends of the chamber and in diametrically opposed portions thereof, and said pressure equalizing vent being placed in a position diametrically opposed to the outlet, said valve shoes being adapted to open the inlet while maintaining the outlet closed and to open the outlet and the pressure equalizing vent while maintaining the inlet closed.

4. A measuring valve comprising, in combination, a cylindrical measuring chamber, a shaft centrally and longitudinally disposed in said chamber, arms on said shaft extending outwardly therefrom toward the inner side walls of the chamber, valve shoes mounted on said arms, said valve shoes having their outer surfaces of a contour adapted to fit snugly against the inner walls of the chamber, resilient means on said arms adapted to press said valve shoes into engagement with the inner side walls of the chamber, an inlet, an outlet and a pressure equalizing vent in the side walls of said chamber, said inlet and said outlet being placed toward opposite ends of the chamber and in diametrically opposed portions thereof with said inlet in a top portion and said outlet in a bottom portion and said pressure equalizing vent being placed in a position diametrically opposed to the outlet, said valve shoes being adapted to open the inlet while maintaining the outlet closed when the shaft is rotated to one position and to open the outlet and the pressure equalizing vent while maintaining the inlet closed when the shaft is rotated to another position.

5. A measuring valve comprising, in combination, a cylindrical measuring chamber, a shaft centrally and longitudinally disposed in said chamber, an inlet and a pressure equalizing vent in the top of said chamber, an outlet in the bottom of said chamber, a pair of arms on said shaft extending outwardly therefrom toward the inlet opening, another pair of arms on said shaft extending outwardly therefrom toward the pressure equalizing vent and a third pair of arms on said shaft extending outwardly therefrom toward the outlet opening, springs on each of said arms and a valve shoe loosely mounted on each pair of arms and held resiliently against the wall of the chamber by means of said springs.

6. A measuring valve comprising, in combination, a cylindrical measuring chamber, an inlet, an outlet, and a pressure equalizing vent in the side walls of the cylindrical chamber, a rotatable shaft disposed in the axis of said measuring chamber and shoe segments mounted on the shaft and adapted to engage resiliently the inlet, outlet and pressure equalizing vent.

7. A measuring valve assemblage comprising, in combination, an outer casing having a cylindrical chamber of predetermined capacity formed therein, one end of said chamber being closed and having a recess formed therein and the opposite end being closed by a removable member having a cylindrical opening formed therein, the longitudinal axis of said opening being disposed to coincide with the longitudinal axis of said cylindrical chamber, an operating shaft arranged to extend through said opening with the longitudinal axis of the shaft coinciding substantially with the longitudinal axis of said chamber and the inner extremity of the shaft seated within the recess of the integral end closure, an entry port located in the upper portion of the cylindrical chamber, an exit port located within the lower portion of the chamber, valves arranged alternately to open and close said ports, valve stems extending from the valves, and resilient means associated with the stems and tending normally to urge the valves toward a closed position, said valves being constructed and arranged to be actuated into open or closed position upon rotary motion being imparted to said longitudinally extending operating shaft.

8. A measuring valve assemblage comprising, in combination, an outer casing having a cylindrical chamber of predetermined capacity formed therein, one end of said chamber being closed by an integral part of the outer casing and having a recess formed therein and the opposite end being closed by a removable member having a cylindrical opening formed therein, the longitudinal axis of said opening being disposed to coincide with the longitudinal axis of said cylindrical chamber, an operating shaft arranged to extend through said opening with the longitudinal axis of the shaft coinciding substantially with the longitudinal axis of said chamber and the inner extremity of the shaft seated within the recess of the integral end closure, an entry port located in the upper portion of the cylindrical chamber, an exit port located within the lower portion of the chamber, valves arranged alternately to open and close said ports, valve stems extending from the valves, and resilient means encircling the stems and tending normally to urge the valves toward a closed position, said valves being constructed and arranged to be actuated into open or closed position upon rotary motion being imparted to said longitudinally extending operating shaft.

JOHN W. CARLSON.